United States Patent [19]
Roberts

[11] 3,951,168
[45] Apr. 20, 1976

[54] CURTAIN VALVE

[75] Inventor: Bob R. Roberts, Marshalltown, Iowa

[73] Assignee: Fisher Controls Company, Inc., Marshalltown, Iowa

[22] Filed: Dec. 27, 1974

[21] Appl. No.: 536,776

[52] U.S. Cl.......................... 137/625.28; 251/DIG. 2
[51] Int. Cl.²........................................ F16K 47/00
[58] Field of Search........... 137/625.28; 251/DIG. 2, 251/118

[56] References Cited
UNITED STATES PATENTS

| | | | |
|---|---|---|---|
| 1,361,879 | 12/1920 | Kuehner | 251/118 |
| 2,216,000 | 9/1940 | Crawford | 251/DIG. 2 |
| 2,675,025 | 4/1954 | Wynkoop | 137/625.28 X |
| 2,918,087 | 12/1959 | Curran | 137/625.3 |
| 3,771,563 | 11/1973 | Hayner | 137/625.28 |

FOREIGN PATENTS OR APPLICATIONS

| | | | |
|---|---|---|---|
| 298,612 | 7/1954 | Switzerland | 137/625.28 |
| 1,056,442 | 4/1959 | Germany | 137/625.28 |

*Primary Examiner*—Arnold Rosenthal
*Attorney, Agent, or Firm*—James C. Bolding

[57] ABSTRACT

Described herein are fluid flow control valves of the type wherein a perforated orifice member is interposed between the valve inlet and outlet, and a flexible membrane is provided which selectively covers and uncovers the perforations in the orifice member. A valve stem is provided which is attached to an edge of the membrane and by reciprocal movement of this valve stem the membrane may be peeled from a surface of the orifice member to expose perforations for fluid flow.

3 Claims, 6 Drawing Figures

CURTAIN VALVE

BACKGROUND OF THE INVENTION

1. Field of the Invention

This invention relates generally to fluid flow control valves. More particularly, this invention relates to valves wherein a membrane or "curtain" is employed to seal a plurality of orifices in a valve orifice block against fluid flow.

2. Description of the Prior Art

In fluid flow control systems, it is frequently necessary to employ a valve which is resistant to cavitation damage in the case of liquid throttling, or resistant to the generation of aerodynamic noise in the case of gas throttling. One type of valve having these characteristics is the curtain valve, in which a flexible membrane, or curtain, is employed to uncover or cover orifices in a valve orifice block, and in which the orifices are parallel to and in line with the valve outlet so as to provide a straight-line flow path through the valve. In such a valve, a flowing fluid does not impinge on valve parts to an appreciable extent during the throttling process by virtue of the straight-line path which it follows when leaving the valve orifices.

SUMMARY OF THE INVENTION

The general purpose of this invention is to provide a curtain type valve having improved throttling characteristics.

A further object is to provide a curtain valve construction wherein a relatively short actuator travel is required to actuate the valve from its closed to its open position.

Another object of this invention is to provide a valve in which long flow restricting passageways are opened for fluid flow at low flow rates and in which progressively shorter, less restricting, passageways are provided as the valve is further opened for higher flow rates.

A still further object of this invention is to provide a valve which is compact in size and inexpensive to manufacture.

Yet another object is to provide a valve which will reduce cavitation in liquids, and noise generation in gases, when throttling these fluids.

To achieve these objects, as well as others which will be apparent, I provide a valve having an inlet and an outlet, and having disposed therebetween a perforated valve orifice block. The orifice block has a number of orifices providing flow passageways through it, and these passageways are parallel to, and adjacent to, the valve outlet passageway. The inlet face of this orifice block is inclined at an angle to the axis of the valve outlet, and a curtain, or flexible membrane, is provided which lies against the inclined inlet face of the block in sealing engagement therewith to cover the orifices and prevent fluid flow through the valve. One end of this curtain is secured to the orifice block, while the opposite end is affixed to a valve stem. The stem is axially reciprocable by means of a handwheel, pneumatic actuator, or other like means, and by retraction of the valve stem the curtain is progressively withdrawn from the face of the orifice block to expose a desired number of orifices, this number of orifices being dependent upon the position of the valve stem.

By the use of an orifice block having an inclined face, a number of advantages may be realized. The orifices in the block may conveniently be formed of different lengths if desired, such that long flow restricting passageways are open for fluid flow when the valve is only slightly opened, and shorter, less restricting, passageways are exposed, when the curtain is further withdrawn from the face of the block. Moreover, the use of an orifice block with an inclined face permits a relatively short stroke of the valve stem to move the curtain from a closed to an open position.

BRIEF DESCRIPTION OF THE DRAWINGS

Attention is now directed to the drawings, wherein like reference numerals designate like or corresponding parts throughout the several views, and in which.

DESCRIPTION OF PREFERRED EMBODIMENTS

Figure 1:
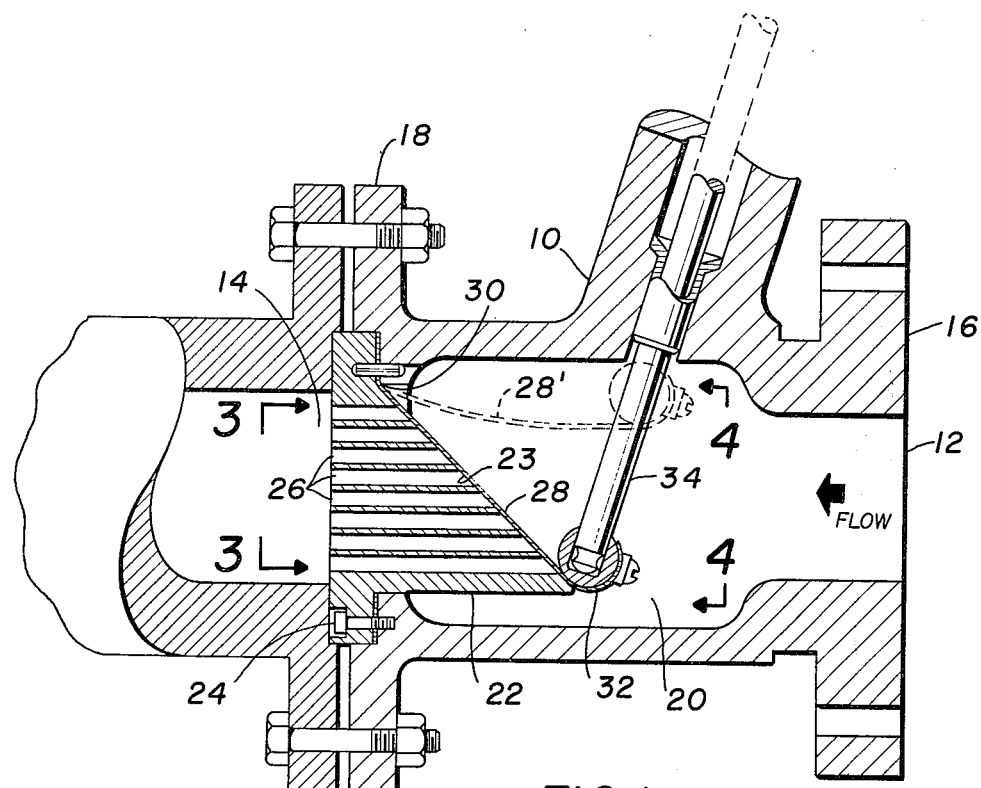
FIG. 1 is a cross-sectional view of a valve constructed according to my invention, shown in a closed position.

Referring now to FIGS. 1–4, a valve, generally designated 10, is shown having an inlet 12 and an outlet 14 and means for securing the valve to piping, for example pipe flanges 16 and 18. Between the valve inlet 12 and outlet 14, there is provided a valve body cavity 20 in which is secured an orifice block 22, the block 22 being here shown secured, by way of example, by a set of screws 24. A set of flow orifices 26 is provided in the orifice block 22 for communcation between the body cavity 20 and the valve outlet 14. A flexible impermeable membrane, or curtain, 28 is attached at one side 30 to an inner face 23 of the orifice block 22 and at its opposite side 32 to a reciprocable valve stem 34. When the valve 10 is in a closed position, as shown in FIG. 1, the curtain 28 lies against the block face 23 and covers all of the orifices 26 in the orifice block 22, thereby preventing flow communication through these orifices. When the valve stem 34 is partially retracted, for example to the position shown in FIG. 2, by suitable actuation means (not here shown), a portion of the curtain 28 is peeled back from the inner face 23 of the block to expose some of the orifices 26 for fluid flow communication between the valve inlet 12 and outlet 14. When the valve stem 34 is further retracted to the position shown by the dashed line of FIG. 1, it will be seen that the curtain is moved to its fully open position, shown by the dashed line 28', in which all of the orifices 26 in the block 22 are exposed for fluid flow.

Figure 2:
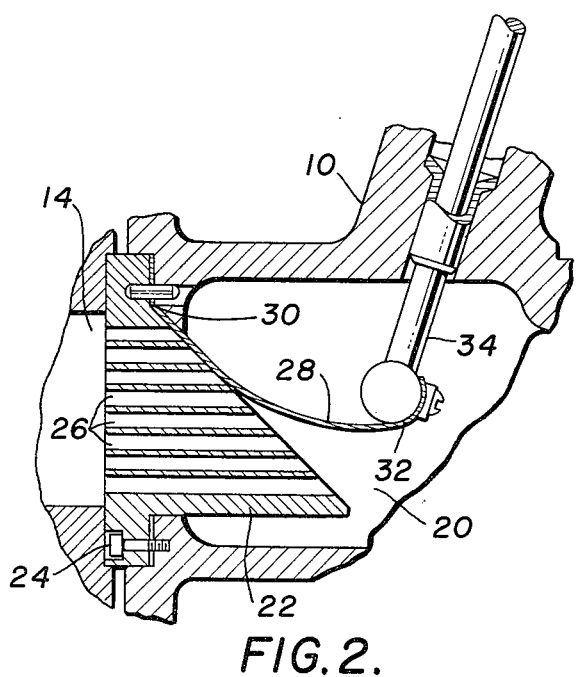
FIG. 2 is a cross-sectional view of the valve of FIG. 1, shown in a partially opened position.

It will be observed that the face 23 of the orifice block 22 is inclined at an angle of approximately 45° to the axis of the valve body in the embodiment of FIGS. 1 and 2, and the valve stem is likewise inclined at an angle of approximately 17° to a line perpendicular to the valve axis. It should be understood that the angle of inclination of the orifice block face 23 may be varied over a wide range, say from about 30° to about 60° to the valve axis, and that the valve stem angle should be selected so that the curtain 28 is pulled taut when the valve is closed and is almost taut when the valve is open. By virtue of this inclination of the face 23 of the orifice block 22, the length of the stroke of the valve stem 34 which is required to move the curtain 28 from its fully closed to its fully open position is reduced substantially below the stroke length which would be required if the face of the orifice block were parallel to, or perpendicular to, the valve body axis. Moreover, in an orifice block 22 having an inclined face the orifices 26 may conveniently be formed of varying lengths, as shown in FIGS. 1 and 2, thereby providing a set of relatively long flow-restricting orifices which are exposed for fluid flow when the valve is only slightly opened, and progressively shorter, less restricting passageways which become exposed as the valve is further opened. Those skilled in the art will understand that this feature will result in improved throttling characteristics of this valve, particularly when employed in a high pressure drop application in which the possibility of cavitation or generation of aerodynamic noise exists.

Figure 3:
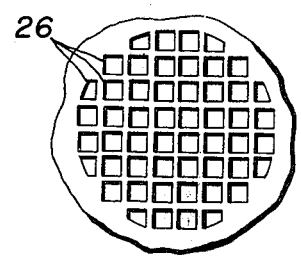
FIG. 3 is a partial view of the outlet end of the orifice block of the valve of FIG. 1 taken along the line 3-3, showing a preferred arrangement of flow orifices.
Figure 4:
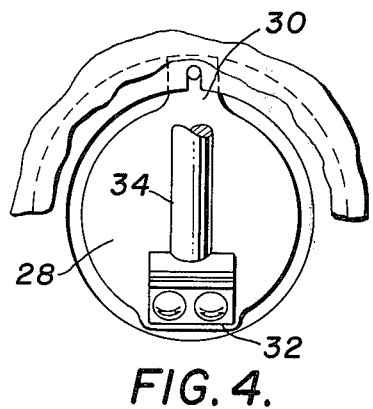
FIG. 4 is a partial view of the valve of FIG. 1, taken along the line of 4—4.

In FIG. 3, there is shown by way of example a suitable layout of the orifices 26 in the orifice block 22. It should be understood, however, that other orifice layouts may be advantageously employed in view of the characteristics of a particular fluid to be throttled, and like considerations. For example, it may be advantageous to provide orifices of a smaller diameter in the thicker portion of the block than in the thinner portion, in order to obtain a desired length to diameter ratio in the various orifices and thereby obtain a desired valve characteristic curve.

Figure 5:
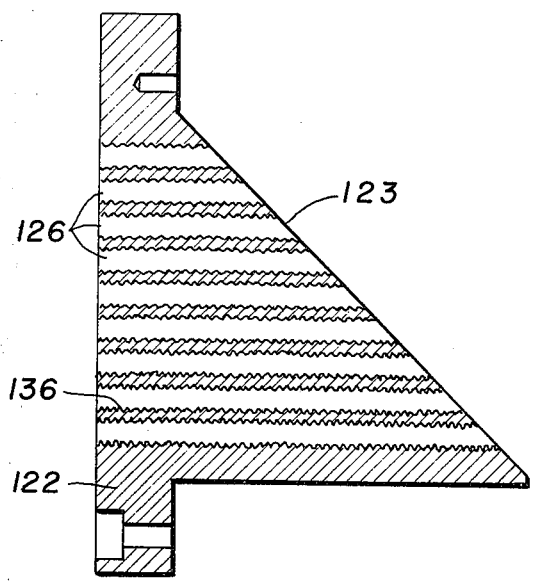
FIG. 5 is a sectional view of an orifice block of alternative design, which is particularly suitable for noise-reducing or cavitation-reducing service.

In FIG. 5, there is shown an alternative design of an orifice block which is particularly suited for high pressure-drop valves. In this orifice block 122 the orifices 126 are shown having roughened inner surfaces of varying lengths. By way of example, these surfaces may be provided with a helical screw thread 136, as shown, or they may be provided with hardened metal inserts of a desired configuration or with some appropriate flow restricting packing suitably retained within the orifices. By the use of such a modified orifice block 122, it will be understood that the possibility of cavitation or excessive noise generation in a flowing fluid may be further reduced.

Figure 6:
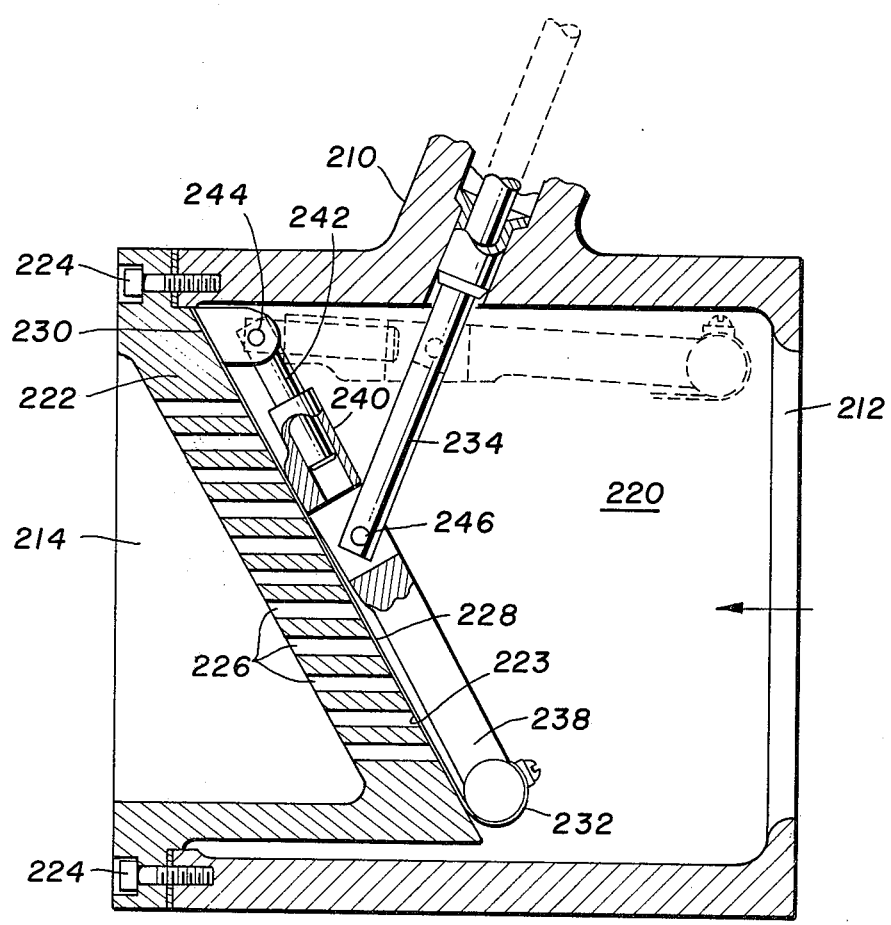
FIG. 6 is a cross-sectional view of an alternative embodiment of this invention.

In FIG. 6 is shown a partial cross-sectional view of an alternative embodiment of this valve which is suitable for use where high flow capacity and lower pressure drops are required. In this valve, generally designated 210, there is retained within a body cavity 220 an orifice block 222 between the inlet 212 and the outlet 214. The orifice block 222 is provided with a set of orifices 226 communicating between the inner face 223 and the outlet side of the block, and these orifices 226 are in this embodiment of substantially the same length. A membrane or curtain 228 is retained at one side 230 against the inner face 223 of the block 222, while the opposite end 232 is secured to one end of a curtain support member 238. The opposite end 240 of this support member 238 is slidably received on a rod 242, the rod 242 being connected at one end to a hinge 224 secured to the valve body in close proximity to the retained side 230 of the curtain. A valve stem 234 is connected to the curtain support member 238 at a point intermediate the ends of that member by means of a hinge pin 246.

The valve of this embodiment is opened by retraction of the valve stem 234 which causes the curtain support member 238 to lift a portion of the curtain 228 from the face of the orifice 222, exposing a desired number of orifices 226 for fluid flow. As the curtain support member is lifted by the valve stem, it slides slightly on the hinged rod 242, this sliding being required in order to permit axial travel of the stem 234. It will be observed that by connection of the valve stem 234 to a point on the curtain support member 238 intermediate the ends thereof, the valve stem travel required to open the valve 210 fully is further reduced below the travel which would be required if the stem were connected to the side 232 of the curtain, as in the embodiment of FIGS. 1–4.

It will be understood that the curtain employed in each of the above-described embodiments of my valve may be constructed of any suitable material, considering the pressure differentials to which the valve is to be subjected when in a closed position and the fluid being throttled by the valve. For high pressure differentials across the valve, a flexible springy metallic curtain may be required in order that fluid pressure not rupture the curtain, while for lower fluid pressure differentials a curtain made of an elastomer, or of a reinforced elastomer, sheet may suffice. In either case, preferably the curtain shall be sufficiently flexible to take advantage of the fluid pressure on the upstream side of the valve to provide the sealing force for the valve in a closed position and to permit the curtain to seal more tightly against the orifice block as the upstream pressure is increased.

Having thus shown and described presently-preferred embodiments, it will be apparent to those skilled in the art that many modifications and variations are possible in the light of the above teachings. It is therefore to be understood that my invention may be practiced other than as herein specifically described.

I claim:

1. A curtain valve, comprising:
    a valve body having an inlet, an outlet, and a central body cavity communicating with said inlet and outlet;
    a valve orifice member mounted in said body cavity, said orifice member including a plurality of flow passageways parallel to, and terminating adjacent to, said valve outlet providing communication for fluid flow between said body cavity and said outlet, and said orifice member further having a face within said body cavity inclined at an acute angle with respect to the direction of said passageways;
    flexible impermeable curtain means for lying against said inclined face in sealing engagement therewith, said curtain means having a first side attached to said inclined face of said orifice block at a point nearest said valve outlet, and a second side opposite said first side; and
    valve actuation means including first means extending into said body cavity and reciprocable toward and away from said inclined face from externally of said valve body, and second means connected to said first means and to said second side of said curtain member;
    whereby by reciprocation of said first means, said second means is movable to withdraw said curtain means from said inclined face of said orifice block to expose a desired number of said flow passageways for fluid flow through said valve.

2. A valve according to claim 1, wherein said flow passageways include passageways of different lengths and wherein as said curtain member is progressively further withdrawn from said inclined face, progressively shorter, less restricting, passageways are exposed for fluid flow.

3. A valve according to claim 1, wherein said passageways are provided with a roughened inner surface having an increased resistance to fluid flow.

* * * * *